Apr. 17, 1923.
J. B. MICHAEL
1,452,165
LOCOMOTIVE WHEEL HUB LINER
Filed June 18, 1921
2 Sheets—Sheet 1
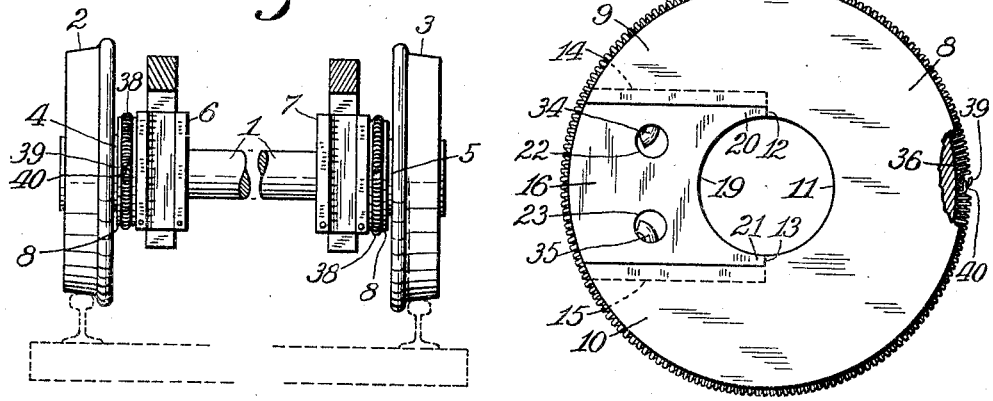
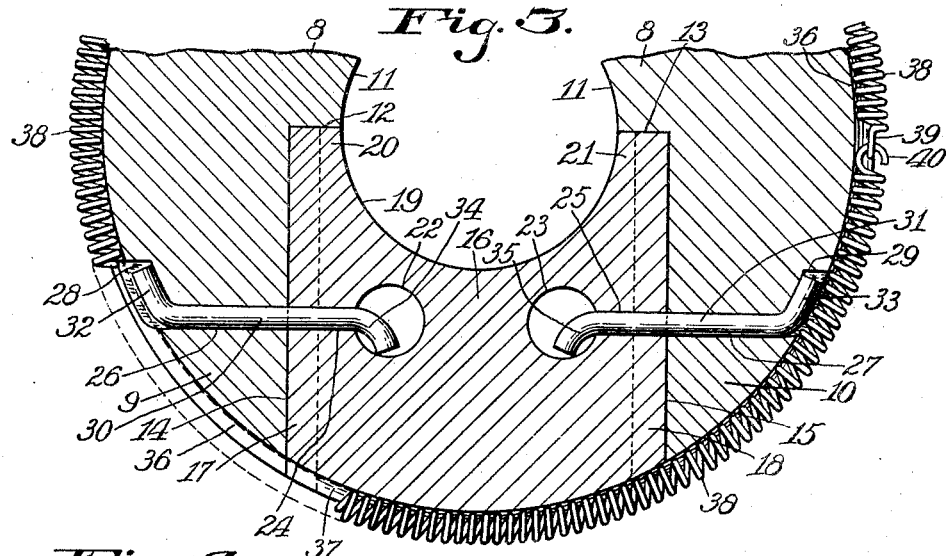
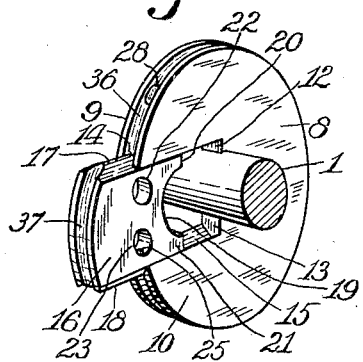
INVENTOR:
John B. Michael,
BY E. T. Silvius,
ATTORNEY

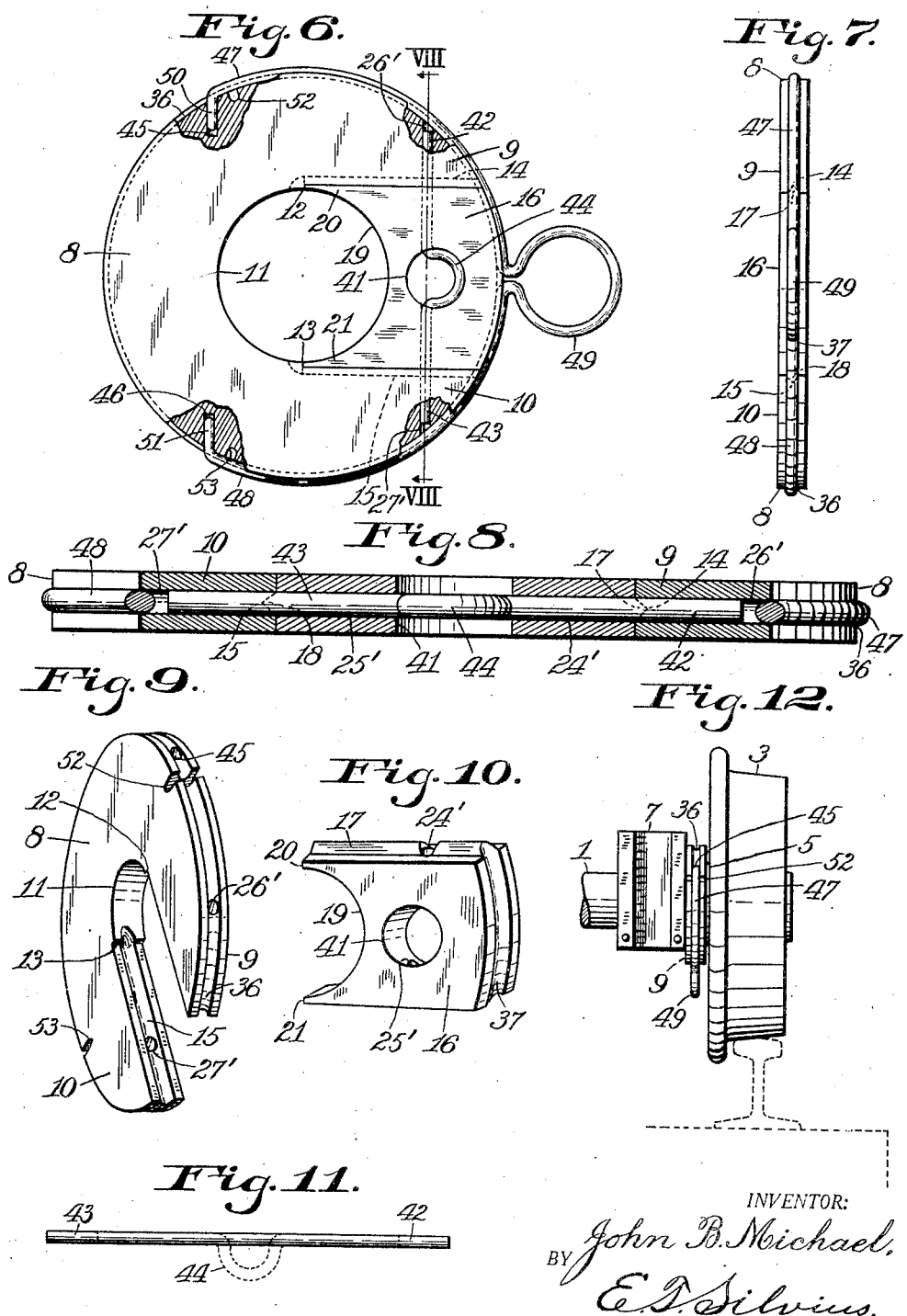

Patented Apr. 17, 1923.

1,452,165

UNITED STATES PATENT OFFICE.

JOHN BAKER MICHAEL, OF SELMA, ALABAMA.

LOCOMOTIVE-WHEEL-HUB LINER.

Application filed June 18, 1921. Serial No. 478,767.

*To all whom it may concern:*

Be it known that I, JOHN BAKER MICHAEL, a citizen of the United States, residing at Selma, in the county of Dallas and State of Alabama, have invented a new and useful Locomotive-Wheel-Hub Liner, of which the following is a specification, reference being had to the accompanying drawings and to the letters and figures of reference marked thereon.

This invention relates to a liner that is designed to be used instead of the liner that has hitherto been secured to a wheel hub or to an adjacent journal box, or to both the hub and the box, to reduce lost motion or excessive play between the hub and the box due to wearing away of the faces of such parts in contact each with the other, the invention having reference more particularly to a sectional hub liner that is designed to be placed on an axle or shaft between a hub and a journal box without removing either the axle or the journal box from the proper relative position thereof in the machinery.

An object of the invention is to provide an improved sectional hub liner or space filler of the above-mentioned character which shall be so constructed as to be suitable for use between the hubs of driving wheels or truck wheels and the adjacent journal boxes of locomotives particularly, and without necessitating loss of time and service of the locomotive with the excessive cost of labor incidental to the removal of the wheels and associated parts from their place in the locomotive.

Another object is to provide a sectional hub liner of the above-mentioned character which shall be so constructed as to permit it to be quickly placed on an axle between a hub and a journal box, and which shall have reliable means and a safety guard whereby to secure the sections of the liner firmly together so as to be dependably kept in place under severe conditions incidental to the operation of locomotives on railroads.

A further object is to provide a sectional hub liner which shall be so constructed as to be strong, and which shall have a plurality of series of devices whereby to reliably secure the sections of the liner together and to an axle, so that the liner will not be liable to drop off and be lost from the axle in case one of the securing devices becomes broken in use or fails to perform its function.

A still further object is to provide a sectional hub liner or space filler which shall be of such design as to permit of its manufacture at small cost and yet be strong, and permit of its being quickly applied and securely fastened in place, and which shall be capable of long service and be economical in use.

With the above mentioned and other objects in view, the invention consists in a hub liner of annular plate form or contour, having a small removable section normally keyed in the liner and rigidly secured in place; and, the invention consists also further in the novel parts and in the combinations and arrangements of parts as hereinafter particularly described and further defined in the accompanying claims.

Referring to the drawings,—Figure 1 represents a pair of locomotive wheels on an axle which supports two journal boxes and a pair of the improved hub liners arranged between the wheel hubs and the journal boxes; Fig. 2 is a plan of the improved hub liner as preferably constructed; Fig. 3 is a fragmentary sectional view of the improved liner on a plane midway between the two working faces of the liner; Fig. 4 is a perspective view of the hub liner as essentially constructed, minus the devices which may be varied for securing the sections of the liner together; Fig. 5 is a fragmentary peripheral or edge view of the improved liner; Fig. 6 is a plan view of the liner slightly modified as to details relating to devices for securing the sections of the liner together; Fig. 7 is a peripheral or edge view of the liner as shown in Fig. 6; Fig. 8 is a section approximately on the line VIII—VIII in Fig. 6; Fig. 9 is a perspective view of the main part of the hub liner slightly modified; Fig. 10 is a perspective view of the removable section of the modified liner; Fig. 11 is a plan of one of the devices for securing the section in the main part of the hub liner, broken lines indicating the form of the device when finally completed to perform its functions; and, Fig. 12 represents the modified form of liner in place between a wheel hub and a journal box.

Similar reference characters in the different figures of the drawings indicate corresponding elements or features of the invention herein referred to in detail.

In the drawings the numeral 1 indicates an axle or shaft, 2 and 3 indicate wheels fixed on the axle and having hubs 4 and 5 respectively, which when newly installed are directly engaged by journal boxes 6 and 7 on the axle to limit the movement of the boxes longitudinally of the axle.

The improved hub liner essentially comprises a main part or plate which consists of a semi-circular body portion 8 and two limbs 9 and 10 with a suitable space between the limbs so that the main part has a gap or opening in it extending inwards from the edge or peripheral portion of the part, the edges of the plate or part at opposite sides of the opening being straight and parallel. The body portion has a concave inner edge 11 designed to conform to the axle on which the liner is to be used. At the inner end of the opening in the main part or plate two stop shoulders 12 and 13 are provided and the straight edges at the sides of the opening have suitable guide faces, preferably grooves 14 and 15 respectively of V-shape transversely. A removable liner section 16 is provided which has two guide faces 17 and 18 on opposite sides thereof conforming to the guides 14 and 15 respectively, so that when the section is inserted in the opening or gap in the main part the section shall be laterally retained in place. The inner end of the removable section has a concave edge 19 and oppositely arranged limbs 20 and 21 that are stopped against the shoulders 12 and 13 respectively, resulting in the edges 11 and 19 together forming a cylindrical bore closely corresponding to the diameter of the axle.

The section 16 of the liner is required to be firmly bolted or pinned to the main part of the liner and has preferably two holes 22 and 23 therein from which bolt holes 24 and 25 extend respectively to similar holes 26 and 27 that are provided in the limbs 9 and 10 respectively. Preferably the limbs have recesses 28 and 29 in the outer or peripheral portion thereof that extend circumferentially from the holes 26 and 27 respectively. A rod or pin 30 is inserted in the holes 26 and 24, and a rod on pin 31 is inserted in the holes 27 and 25. The outer ends of the rods have head portions 32 and 33 thereon that are received in the recesses 28 and 29 respectively and the inner ends of the rods which appear in the holes 22 and 23 have heads 34 and 35 respectively that are formed by bending the rod, preferably after heating the rod, so that the head portions in the holes shall draw against the metal and tend to draw the limbs 9 and 10 towards the removable section of the liner, in order that the limbs shall not be liable to be broken off from the main portion 8.

Preferably the periphery of the liner has a groove therein, there being a groove 36 in the main part and a continuing groove 37 in the section 16, and a suitable safety guard securing device is arranged in the groove, and it co-operates with the outer heads to secure the retaining pins in place, the securing device preferably being an elastic band 38 constructed as a stiff coil spring, having two hooks 39 and 40 connected together, the spring thus constituting a continuous band and being sufficiently strong to retain the section 16 in the main part of the liner while permitting the band to be forcibly sprung into or out of the groove, and in some cases it may not be necessary that the entire band be coiled.

In some cases the section 16 is provided with one hole 41 from which extend pin-holes 24' and 25' so as to be in alinement with pin-holes 26' and 27' provided in the limbs 9 and 10 respectively, and two pins or rods 42 and 43 are arranged in the pin holes and preferably are connected to a loop 44 which is formed by bending head portions on the pins or rods within the hole 41, the head portions securely retaining the pins or rods in place.

When desired a slightly different safety guard banding device than that described may be provided, and to this end the body portion 8 of the main part or plate is provided with two sockets 45 and 46 extending from the bottom of the groove 36, and two clasp arms or banding sections 47 and 48 are arranged in the groove so as to engage and retain the section 16, and the arms are preferably integrally connected to a spring loop 49 permitting the arms to be forcibly sprung out of place when necessary, the ends of the arms having lugs 50 and 51 thereon that are inserted in the sockets 45 and 46, respectively. The body portion 8 preferably has also two notches 52 and 53 therein adjacent to the sockets and so as to be covered by the arms, to receive a tool whereby to force one arm outwards to draw the lug from the socket when required.

In practical use a liner of proper thickness to reduce the space between the hub and the journal box to the desired extent is selected from stock, and after separating the parts of the liner the main part is placed in the required position on the axle or shaft, after which the removable section is inserted into the main part. When the pins or rods for securing the section in place are made separately they are inserted through the pin-holes 26 and 27 respectively, after which the head portions 34 and 35 are formed by bending the rods which may have been previously heated. When additional safeguard is desired the band or clasp device may be applied, and so as to retain the securing pins or rods in place, as above described.

When the pins 42 and 43 are preferred a straight rod is first inserted in the pin-holes, after which the middle portion of the rod is bent in the hole 41 to form the head portions and loop 44, the bending being more easily done if the middle portion of the rod is first heated. In the operation of the locomotive or a machine the side faces of the liner will be worn away while the faces of the hub and the journal box are also further worn away, until an excessive amount of lost motion again develops. The liner may become worn until in some cases it becomes quite thin, affecting its stability materially or impairing the efficiency of the device for securing the parts of the liner together. Finally, when a thicker liner is required it may be readily applied as is apparent after first removing the old liner. In some cases the old liner may be useless for further service and may be readily broken up by force to permit it to be quickly removed from place.

Under the severe conditions imposed upon the liner in operation, the securing pins or rods or portions of the liner adjacent thereto may possibly be broken so as to impair the securing devices, but the safety guard band may in such case be relied upon to at least temporarily hold the parts of the liner together and on the axle, or until customary inspection is made and the damage repaired, without serious risk of the liner falling off and causing derailment of the locomotive or train.

Having thus described the invention, what is claimed as new is:—

1. An annular hub liner plate with a circumferential groove in its outer edge, a small section of the plate being removable from the remaining portion thereof, securing pins inserted in the small section and the adjacent portions of the liner plate and securing the section in place, the pins extending into the groove, and an elastic safety guard banding device arranged in the groove and extending across the securing pins and the small section in engagement therewith, the banding device co-operating with the main part of the liner plate and the securing pins to retain the pins and the small section of the plate in place.

2. A sectional hub liner including a unitary main plate comprising a body portion and two limbs, each limb having a straight longitudinal guide on its entire inner edge and having also a pin-hole therein extending through the guide, a liner section inserted between the limbs of the main plate and having guides on entire opposite edges thereof engaging the guides on the limbs respectively, the liner section having also two pin-holes therein extending through the adjacent guides in alinement with the pin-holes in the limbs respectively, the main plate and the liner section together constituting a circular plate with a central bore therein, a securing pin arranged in the pin-hole in one of the limbs and in one of the pin-holes in the liner section, and a securing pin arranged in the pin-hole in the opposite one of the limbs and in the remaining one of the pin-holes in the liner section, each one of the securing pins having a head secured in the liner section.

3. In a sectional annular hub liner, the combination with a unitary main liner plate having a gap therein and a pin-hole extending from the gap, of a sectional plate inserted in the gap and having an aperture therein and also a pin-hole extending from the aperture to the pin-hole in the main liner plate, and a securing pin inserted in the pin-holes and having a head thereon arranged in the aperture in the sectional plate.

4. An annular hub liner comprising a main part having an opening extending from the outer curved edge thereof and pin-holes extending from the opening to said curved edge, and a smaller sectional part removably inserted in said opening and guided therein, the sectional part having two apertures therein and also pin-holes extending from the apertures respectively to the pin-holes respectively in the main part to receive securing pins with heads thereon to be received in the apertures respectively.

5. In a sectional annular hub liner, the combination of a main part having an opening extending from the outer edge thereof and guides on the edges thereof that are at opposite sides of the opening, said part having a circumferential groove in its outer edge and pin-holes extending from the groove to said opening, with a sectional part inserted in said opening and guided by said guides, the sectional part having pin-holes extending from the pin-holes in said main part, securing pins in the pin-holes in said parts and extending to said groove, and a safety guard arranged in said groove and extending against the outer ends of the securing pins and along the outer edge of the sectional part, the guard being secured in place.

6. In a sectional annular hub liner, the combination of a main part having an opening extending from the outer edge thereof and guides on the edge thereof that are at opposite sides of the opening, said part having a groove in the outer edge thereof and recesses in the bottom of the groove and having also pin-holes extending from the recesses to said opening, a sectional part inserted in said opening and guided by said guides, the sectional part having apertures therein and pin-holes extending therefrom to the pin-holes in the main part, securing pins inserted in the pin-holes in the main part and having heads arranged in said recesses respectively, said pins extending through the pin-holes in said sectional part and having heads engaging the part in the adjacent aperture in said part, said sectional part having a groove in its outer edge, and a safety guard secured in said grooves and extending across the heads of said pins in said recesses.

7. In a sectional annular hub liner, the combination of a main part having an opening extending from the outer edge thereof and guides on the edges thereof that are at opposite sides of the opening, said part having recesses in the outer edge thereof and pin-holes extending from the recesses to said opening, a sectional part inserted in said opening and having guides on opposite edges thereof in contact with the guides on said main part, the sectional part having two apertures therein and also two pin-holes extending from the apertures respectively to the pin-holes respectively in said main part, and two securing pins for the sectional part, one of the pins having a head arranged in one of said recesses and extending through the adjacent pin-holes and having a head portion in the next adjacent one of said apertures, the remaining one of said pins having a head arranged in the remaining one of said recesses and extending through the adjacent pin-holes and having a head portion in the remaining one of said apertures.

8. A sectional hub liner comprising a main liner plate having a gap therein, a smaller sectional plate removably inserted in the gap and being guided therein, said plates being adapted to constitute an annular plate, securing pins inserted in the main liner plate and the adjacent portions of the sectional plate and extending to the outer curved edge of the main liner plate, and a safety guard co-operating with the main liner plate and the sectional plate and also with the securing pins to secure the pins and the sectional plate in the main plate.

9. A sectional annular hub liner comprising a main liner plate having an opening extending from the outer edge thereof, the plate having recesses in its outer edge and pin-holes extending from the recesses respectively to said opening, to receive securing pins with heads thereon in the recesses, a smaller sectional liner plate inserted in said opening and being guided therein and having pin-holes therein extending from said pin-holes in the main plate to receive the securing pins, and means to co-operate with the sectional liner plate to retain the heads of the securing pins in said recesses and the pins in the pin-holes.

10. In a sectional hub liner, the combination with a main part having a circumferential groove in its outer edge and an opening extending from said edge, said part having pin-holes extending from said groove to said opening, of a smaller sectional part inserted in said opening and being guided therein, the sectional part having pin-holes in the body portion thereof extending from the pin-holes in said main part, said parts together constituting an annular plate, and securing pins insertible in the pin-holes in said parts to secure them together and provided with means to co-operate with the smaller sectional part to retain the pins in the pin-holes.

In testimony whereof, I affix my signature in presence of two witnesses.

JOHN BAKER MICHAEL.

Witnesses:
AGNES McPECK,
W. A. McDOWELL.